G. A. RICHTER.
PROCESS OF MAKING CALCIUM BISULFITE.
APPLICATION FILED JUNE 10, 1919.
1,378,616.
Patented May 17, 1921.
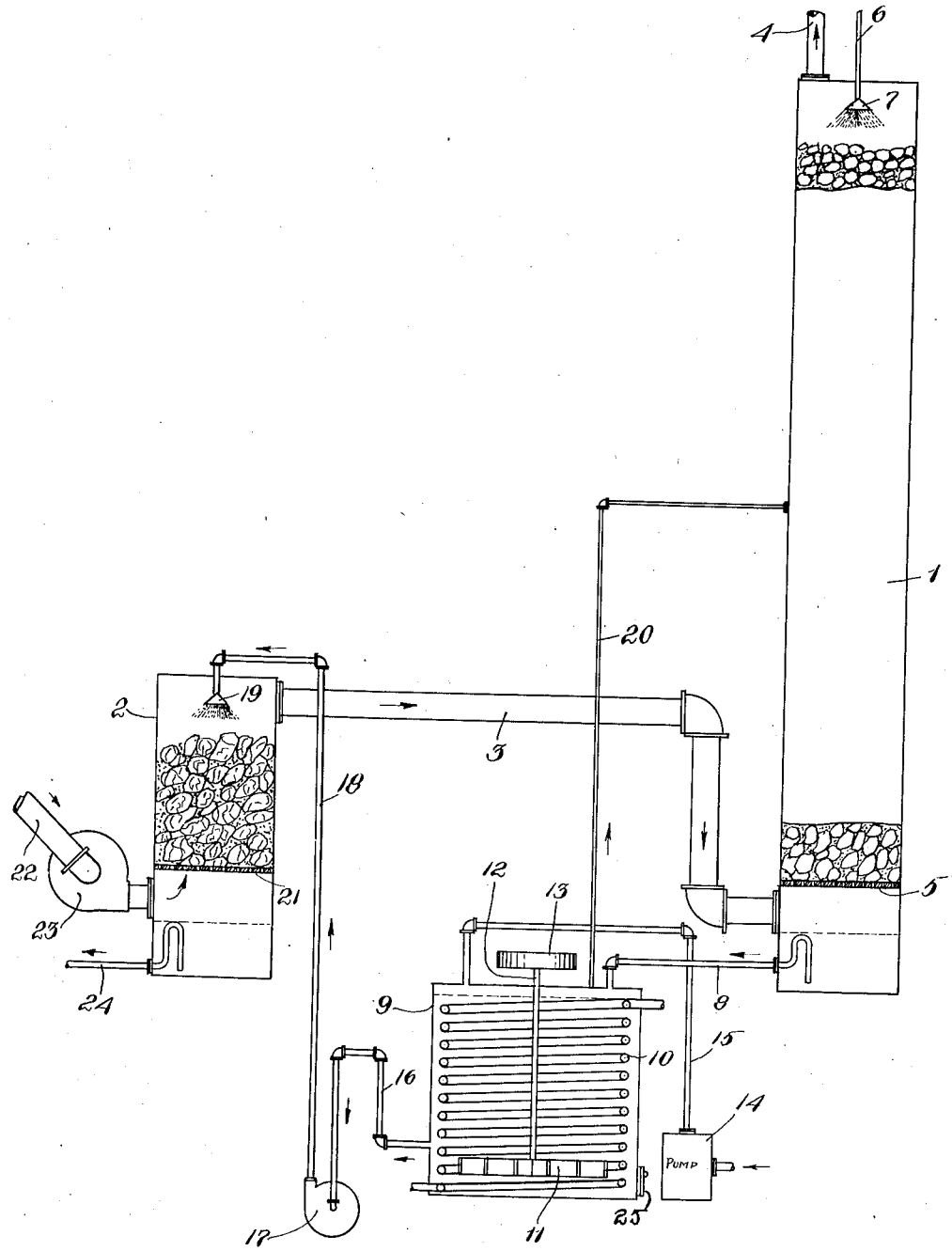
Inventor
George A. Richter
by Wright Brown Quinby May
Attorneys

UNITED STATES PATENT OFFICE.

GEORGE A. RICHTER, OF BERLIN, NEW HAMPSHIRE, ASSIGNOR TO BROWN COMPANY, OF BERLIN, NEW HAMPSHIRE, A CORPORATION OF MAINE.

PROCESS OF MAKING CALCIUM BISULFITE.

1,378,616.  Specification of Letters Patent.  Patented May 17, 1921.

Application filed June 10, 1919. Serial No. 303,104.

*To all whom it may concern:*

Be it known that I, GEORGE A. RICHTER, a citizen of the United States, residing at Berlin, in the county of Coos and State of New Hampshire, have invented new and useful Improvements in Processes of Making Calcium Bisulfite, of which the following is a specification.

This invention has relation to the manufacture of calcium bisulfite liquor such as utilized in the digestion of wood pulp, and has for its object to produce a solution which is rich in free sulfurous acid.

In accordance with the present invention, instead of attempting to cause a reaction between the sulfur dioxid and milk of lime, or passing the free gas through a lime tower where it meets a counter-stream of water, I cause the reaction to take place between the lime constituent and an acidulated water in a tank or compartment separate from that in which the gas is absorbed by the water, and then, preferably, I add an additional quantity of $SO_2$ to the product of the reaction to produce a calcium bisulfite solution especially rich in free sulfurous acid.

On the accompanying drawing, I have illustrated conventionally and diagrammatically an apparatus by which my process may be practised, but it will be understood that various instrumentalities constituting the apparatus are capable of many variations.

The process may be carried on in three stages. First, the stream of water is introduced into an atmosphere of sulfur dioxid and is caused to absorb as much $SO_2$ as it can under the temperature conditions prevailing; then the acidulated water is mixed with the necessary lime to bring it to the desired percentage of combined $SO_2$; and then the soluble product of reaction is passed through an atmosphere of sulfur dioxid and subjected to the action of the gas to increase the free sulfurous acid content therein. In actual practice, I employ two towers between which is located the reaction chamber or vessel in which the acidulated water is partially neutralized by the lime. Conduits connect the tank with the eduction port of the tower in which the water is acidulated, and with the tower in which the additional content of free sulfurous acid is added to the soluble product of the reaction. The gas, as delivered from the sulfur burner, is fed first to the last-mentioned tower,—that, which is not absorbed, thence passing to the first-mentioned tower for the acidulation of the oncoming water.

Referring to the diagrammatic illustration of the apparatus,—1 indicates the tower in which the acidulation of the water takes place, and 2 indicates the other tower in which the additional content of free sulfurous acid is added to the calcium bisulfite solution. A gas conduit 3 leads from the top of the tower 2 to the base of the tower 1, and at the upper end of the last-mentioned tower there is a vent pipe 4 for carrying away the unabsorbed and inert gases. Within the tower 1 near the base thereof, there is a perforated partition 5 which supports a mass of interstitial surface material, through and on which the water, which is acidulated, may trickle in thin films, thereby to expose the greatest surface of water to the action of the gas. This material may consist of spiral brick, field rock or other inert material suitable for the purpose mentioned. The water to be acidulated is delivered to the upper end of tower 1 from any suitable source by a pipe 6 terminating in a spraying nozzle 7. In constructing the tower, any suitable inert material may be used, such as wood or concrete lined with acid-proof brick. Following the course of the water, it will be seen that, as it trickles in thin films down through the interstices and over the surfaces of the surface material, it meets the stream of gas delivered to the lower end of the tower through the conduit 3, and absorbs the sulfur dioxid which is passing through the tower in counter-current. The acidulated water, which collects in the lower end of the tower, flows therefrom through the pipe 8 to the reaction tank 9. This tank is made of any suitable material, and may be provided with refrigerating coils 10, through which a suitable refrigerant is forced to absorb the heat liberated by the exothermic reaction and thereby maintain the mixture and the solution therein at a relatively low temperature,—say approximately zero centigrade. Within the reaction chamber, there is located near the lower end thereof an agitator or stirrer 11, supported by a shaft shown conventionally at 12, to which rotation is imparted by any suitable means. A belt pulley 13 is indicated as a part of the power-transmitting mechanism for effecting the rotation of the shaft and the agitator or stirrer thereon. The acidulated water contains approximately 1½% to 3% of $SO_2$, depending upon the percentage of combined sulfur dioxid desired in the final liquor. The lime may be in the form of milk of lime or it may consist of a suspension of water and ground calcium carbonate, lime-stone or the like. The mixing of the ground material with water may take place in any suitable mixing apparatus from which it is pumped by a pump 14 through a conduit 15 to the top of the reaction tank 9. It is not necessary, however, that the lime material should be thus pumped into the reaction tank, as it may be introduced in dried condition through a suitable manhole or regulator into the tank. The pool of acidulated water and the calcium-bearing material are caused to react in the chamber 9, and the clear calcium bisulfite solution, containing some excess of sulfur dioxide, flows outwardly from the tank through the pipe 16, and is pumped by the pump 17 through the conduit 18 to the top of the tower 2 and is delivered thereinto through the spraying nozzle or head 19. For the purpose of relieving any gases that may collect in the top of the reaction tank, a small vent pipe 20 leads therefrom to the tower 1, as illustrated.

The tower 2 may be substantially similar in construction to the tower 1, except that it is preferably less in height, and it, too, is provided in its interior with surface material for causing the solution, which is sprayed thereinto by the nozzle 19, to trickle down through the interstices and form thin films so as to meet a counter-flow of $SO_2$. Like tower 1, tower 2 is provided with a perforated partition 21 for supporting the spiral brick, rock or other inert interstitial surface material. The $SO_2$, coming from the sulfur burner through the conduit 22, is forced by the fan 23 into the lower end of the tower 2 and flows upwardly through the interstices in the surface material, meeting the downflowing calcium bisulfite solution and causing the absorption thereby of the desired quantity or percentage of free sulfurous acid. From the lower end of tower 2, the calcium bisulfite solution, which is now rich in free sulfurous acid, is conducted away through the outlet pipe 24 to a storage tank, from which it is drawn as needed for use into the digesters.

It will be seen from the foregoing description that no reaction between the lime content and the sulfur dioxid is caused or permitted to occur in either of the towers. This reaction takes place exclusively in a special reaction tank in which the contents may be refrigerated to a point where the maximum desired proportions of gas may be absorbed or caused to combine with the lime.

There are various advantages incident to the process which doubtless will be apparent to acid makers, but I may refer to several of the more salient. For example, in old methods as commercially practised considerable trouble was experienced due to the formation of insoluble calcium monosulfite within the reaction towers or tanks. The formation of such monosulfite tends to clog the interstices in the lime towers and other parts of the system, and eventually stops the flow of gas. When this occurs, it is necessary to dismantle the system, remove the lime-stone, and, after cleaning out the calcium monosulfite, to reëstablish the system. This is entirely avoided by the practice of my process as herein described,—due to the fact that there is sufficient $SO_2$ carried by the acidulated water from tower 1 to immediately dissolve the lime constituent which is supplied to the tank, thus preventing the formation of monosulfite. Of course it will be understood that the supply of water to the acidulating tower 1 and of lime to the reaction tank may be so regulated that substantially the theoretical quantities or volumes of both for the desired reaction are admitted. Ordinarily it is desired that the $SO_2$ delivered to the reaction tank should be slightly in excess of that theoretically demanded. This offers the further advantage over the ordinary limestone systems in that a definite proportion of lime can be delivered for reaction with a definite proportion of acidulated water, thus insuring the desired percentage of combined $SO_2$ in the final liquor leaving the tower 2.

So far as I am aware, I am the first, in the preparation of cooking bisulfite acid, to first acidulate the water with $SO_2$ in a separate absorber before causing the reaction with lime, and also the first, after such reaction takes place, to subject the soluble products of reaction to a further acidulating process in a second absorber to increase the proportion of free sulfurous acid therein.

What I claim is:

1. A process of making calcium bisulfite cooking liquor which consists in first acidulating water with sulfur dioxid in one absorbing chamber, and then causing such acidulated water to react with lime in a separate absorbing chamber.

2. A process of making calcium bisulfite, which consists in first acidulating water with sulfur dioxid, then causing such acidulated water to react with lime, and finally further acidulating the product of such reaction.

3. A process of making calcium bisulfite, which consists in passing a stream of water first in the presence of sulfur dioxid, to acidulate the same, and next into the presence of a calcium-bearing material to cause the reaction to take place.

4. A process of making calcium bisulfite, which consists in passing a stream of water first in the presence of sulfur dioxid, to acidulate the same, next into the presence of a calcium-bearing material to cause the reaction to take place, and finally, with its soluble products of such reaction in the presence of sulfur dioxid, to add thereto or increase therein the desired content of free sulfurous acid.

5. A process of making calcium bisulfite, which consists in passing a stream of water in relatively thin films through an atmosphere of sulfur dioxid to acidulate such water in passage, causing a reaction between such acidulated water and a calcium-bearing material, and passing the soluble products of such reaction in relatively thin films through an atmosphere of sulfur dioxid.

6. The herein described process, which comprises passing sulfur dioxid into successive towers, passing water in the opposite direction through said towers in the presence of said gas, and adding to such water at a point between such towers a calcium-bearing material, whereby the water is first acidulated, the acidulated water reacts with calcium to form a calcium bisulfite solution, and the resulting solution is further acidulated.

In testimony whereof I have affixed my signature.

GEORGE A. RICHTER.